(12) United States Patent
Meyer et al.

(10) Patent No.: US 6,266,964 B1
(45) Date of Patent: Jul. 31, 2001

(54) USE OF ELECTRONIC EXPANSION VALVE TO MAINTAIN MINIMUM OIL FLOW

(75) Inventors: Jonathan M. Meyer; Lee L. Sibik, both of Onalaska; Sean A. Smith, La Crosse, all of WI (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/480,362

(22) Filed: Jan. 10, 2000

(51) Int. Cl.[7] ............................. F25D 17/02; F16K 21/18
(52) U.S. Cl. ........................... 62/115; 62/188; 137/392
(58) Field of Search .................. 62/126, 188, 115, 62/218; 137/392, 429

(56) References Cited

U.S. PATENT DOCUMENTS

| | | | |
|---|---|---|---|
| 3,029,354 | * 4/1962 | Watkins | 62/218 X |
| 3,224,638 | * 12/1965 | Harrell, Jr. | 137/392 X |
| 4,526,523 | 7/1985 | Parker | 418/84 |
| 4,843,832 | * 7/1989 | Yamada et al. | 62/218 X |
| 5,000,009 | 3/1991 | Clanin | 62/115 |
| 5,011,112 | 4/1991 | Glamm | 251/129 |
| 5,341,658 | 8/1994 | Roach et al. | 62/468 |
| 5,347,821 | 9/1994 | Oltman et al. | 62/84 |
| 5,419,146 | 5/1995 | Sibik et al. | 62/115 |
| 5,431,025 | 7/1995 | Oltman et al. | 62/84 |
| 5,588,596 | 12/1996 | Hartfield et al. | 239/542 |
| 5,600,960 | 2/1997 | Schwedler et al. | 62/99 |
| 5,632,154 | 5/1997 | Sibik et al. | 62/99 |
| 5,645,124 | 7/1997 | Hartfield et al. | 165/117 |
| 5,809,795 | * 9/1998 | Beaverson et al. | 62/218 |

\* cited by examiner

Primary Examiner—William Wayner
(74) Attorney, Agent, or Firm—William J. Beres; William O'Driscoll; Peter D. Ferguson

(57) ABSTRACT

A method of controlling an expansion valve including the steps of: measuring a primary system condition; determining an error in the primary system condition; measuring a secondary system condition; determining an error in the secondary system condition; and modulating the expansion valve based upon the larger of the first or second error.

13 Claims, 2 Drawing Sheets

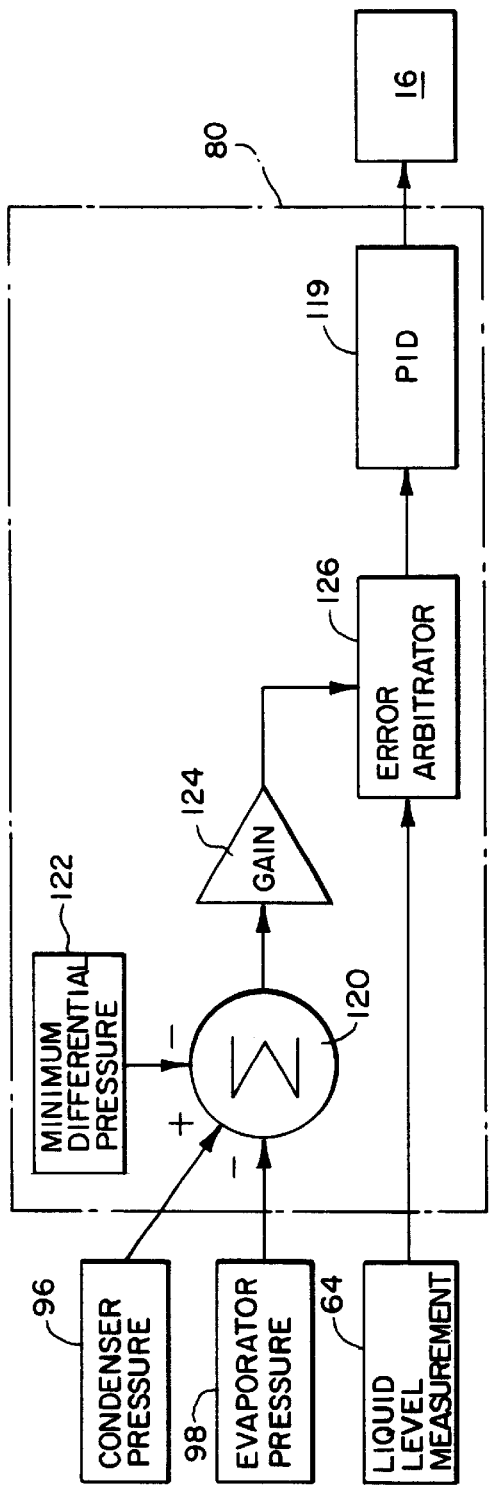
FIG. 2
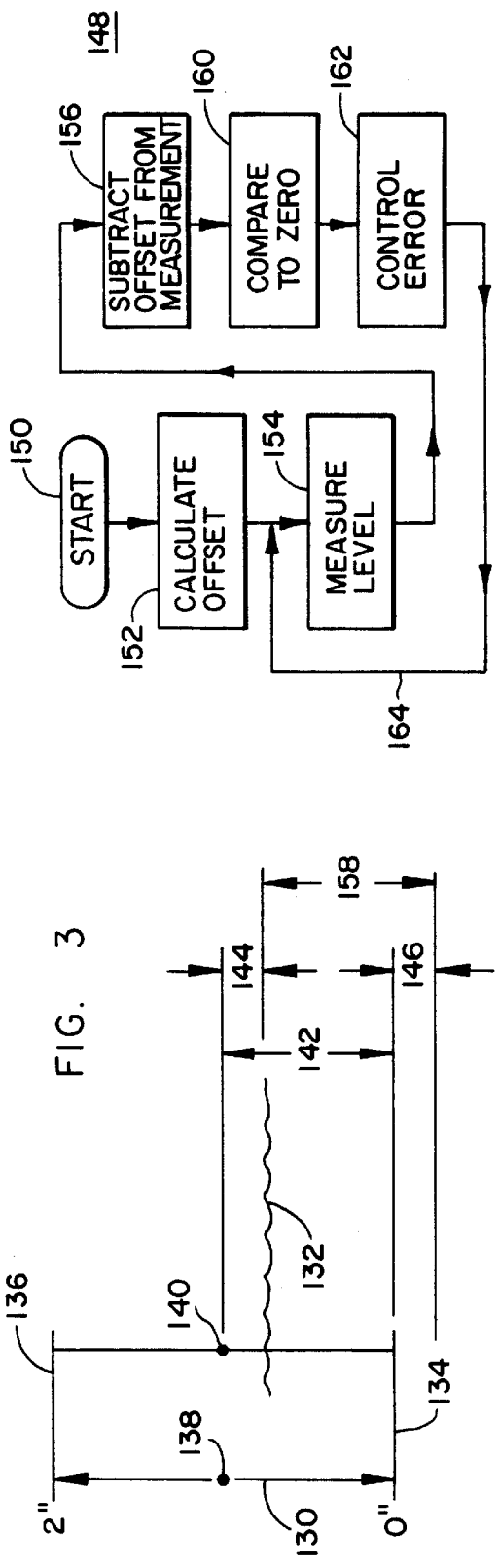
FIG. 4
FIG. 3

USE OF ELECTRONIC EXPANSION VALVE TO MAINTAIN MINIMUM OIL FLOW

BACKGROUND OF THE INVENTION

The present invention is directed to heating, ventilating and air conditioning (HVAC) systems, to refrigeration systems, and to chiller systems which modulate an expansion valve to maintain a system condition such as superheat, refrigerant liquid level, or chilled water temperature. The present invention proposes to also modulate the expansion valve to maintain minimum lubricant flow to the compressor or compressors. For purposes of this application, chiller systems is defined to also include HVAC systems and refrigeration systems.

Certain systems use the differential pressure across the compressor to return lubricant to the compressor. The lubricant is used in the compressor to lubricate bearings or the like and to seal the gap between the compressor's rotors, wraps or other compressing elements.

In some systems, the expansion valve is modulated to maintain refrigerant liquid level control in one of the system heat exchangers. The condensing heat exchanger can be cooled by a chilled water loop provided by, for example, a cooling tower and determined by a cooling water temperature. The evaporating heat exchanger can provide chilled water for use as a heat transfer medium and the expansion valve can be modulated to maintain the chilled water temperature of the fluid provided by the evaporating heat exchanger. If the evaporating heat exchanger is a falling film type evaporator, the expansion valve is modulated to maintain a liquid level in the evaporating heat exchanger.

With such liquid level control, the differential pressure across the compressor is determined by the difference between the cooling water temperature and the chilled water temperature. If the difference between the cooling water temperature and the chilled water temperature is small or inverted, the differential pressure will be too small to pump lubricant back to the compressor. The chiller system will shutdown on a low oil flow diagnostic or a loss of oil diagnostic. The conditions causing this are typical of those which occur when a system is started with a low cooling tower temperature and warm chilled water temperature.

More specifically, under normal running conditions, the liquid level controller maintains a pool of liquid in the bottom of the evaporating heat exchanger. A liquid level sensor measures the depth of the pool and a PID algorithm in the controller maintains a desired level by modulating an electronic expansion valve to change its position and affect the rate of refrigerant flow into the evaporator. The liquid level controller maintains a mass balance between the flow of refrigerant vapor removed from the evaporator by the compressor and the flow of liquid refrigerant returned from the condenser to the electronic expansion valve. When the electronic expansion valve is opened, the flow of refrigerant into the evaporator increases and at some point will exceed the flow out of the evaporator. This causes the condenser to drain to the point that the vapor will flow from the condenser to the evaporator rather than liquid refrigerant. Mass balance will then be re-established because of the refrigerant vapors lower density. However, the flow of refrigerant vapor reduces the chiller system efficiency because the vapor is eventually pumped back to the condenser without providing effective cooling.

On the other hand, when the expansion valve is closed, refrigerant flow out of the evaporator is such that it is less than the flow in. This causes the evaporator pool to fall and eventually dry out. Because the compressor is removing more refrigerant from the evaporator than the electronic expansion valve is allowing to enter the evaporator, the evaporator pressure will fall. As this evaporator pressure falls, the differential pressure across the compressor increases. The higher differential pressure reduces the compressor efficiency and flow through the compressor falls such that the mass flow balance is re-established but the chiller efficiency is again reduced.

It would be advantageous that the expansion valve could be controlled to both maintain the liquid level and to maintain the compressor pressure differential at or above a desired minimum threshold.

SUMMARY OF THE INVENTION

It is an object, feature and advantage of the present invention to solve the problems in the prior art expansion valve controllers.

It is an object, feature and advantage of the present invention to control an expansion valve to maintain a minimum compressor pressure differential.

It is an object, feature and advantage of the present invention to control an expansion valve to maintain a system criteria such as liquid level, superheat, or chilled water temperature as a primary criteria.

It is a further object, feature and advantage of the present invention to use the expansion valve to maintain a secondary criteria such as a minimum compressor pressure differential.

It is an object, feature and advantage of the present invention to establish lubricant flow to the compressor in inverted start conditions.

It is an object, feature and advantage of the present invention to establish and/or maintain oil flow to the compressor in system starts where there are low system differential temperatures or pressures.

It is an object, feature and advantage of the present invention to increase a chiller systems operating envelope.

It is an object, feature and advantage of the present invention to use an electronic expansion valve to assist in building and controlling system differential pressures.

The present invention provides a method of controlling an expansion valve including the steps of: measuring a primary system condition; determining an error in the primary system condition; measuring a secondary system condition; determining an error in the secondary system condition; and modulating the expansion valve based upon the smaller of the first or second error.

The present invention also provides a method of controlling an expansion valve including the steps of: measuring a refrigerant liquid level; comparing the measured refrigerant liquid level with a desired refrigerant liquid level to establish a refrigerant level error; measuring a system pressure differential; comparing the measured system pressure differential with a minimum required system pressure differential to determine a system differential pressure error; comparing the liquid level error to the differential pressure error to determine the smaller error; and modulating the expansion valve to control the smaller error. Smaller means smallest positive or largest negative which will cause the smallest opening or biggest close.

The present invention further provides a method of controlling liquid level in an HVAC system. The method comprises the steps of: physically calibrating a liquid level sensor to a desired level; calculating an offset from a selected point of the liquid level sensor to a lower end;

measuring a liquid level; subtracting the calculated offset from the measured liquid level; comparing the subtracted result to zero to determine an error; and controlling the liquid level to minimize the error.

The present invention still further provides a method of maintaining a minimum differential pressure across a compressor. The method comprises the steps of: operating a compressor to compress a fluid and thereby creating a pressure differential between a compressor input and a compressor output; measuring the pressure differential, comparing the measured differential to a desired pressure differential, and determining a pressure differential error; and controlling an expansion valve, responsive to the pressure differential error, to maintain a minimum pressure differential across the compressor.

BRIEF DESCRIPTION OF THE DRAWING

FIG. 2 is a schematic diagram of the expansion valve control arrangement according to the present invention.

FIG. 3 is a diagram demonstrating how the liquid level ranges are calibrated to avoid the use of a conventional setpoint.

FIG. 4 is a flow chart of the operation of the present invention as described with regard to FIG. 3.

DETAILED DESCRIPTION OF THE DRAWING

Figure 1:
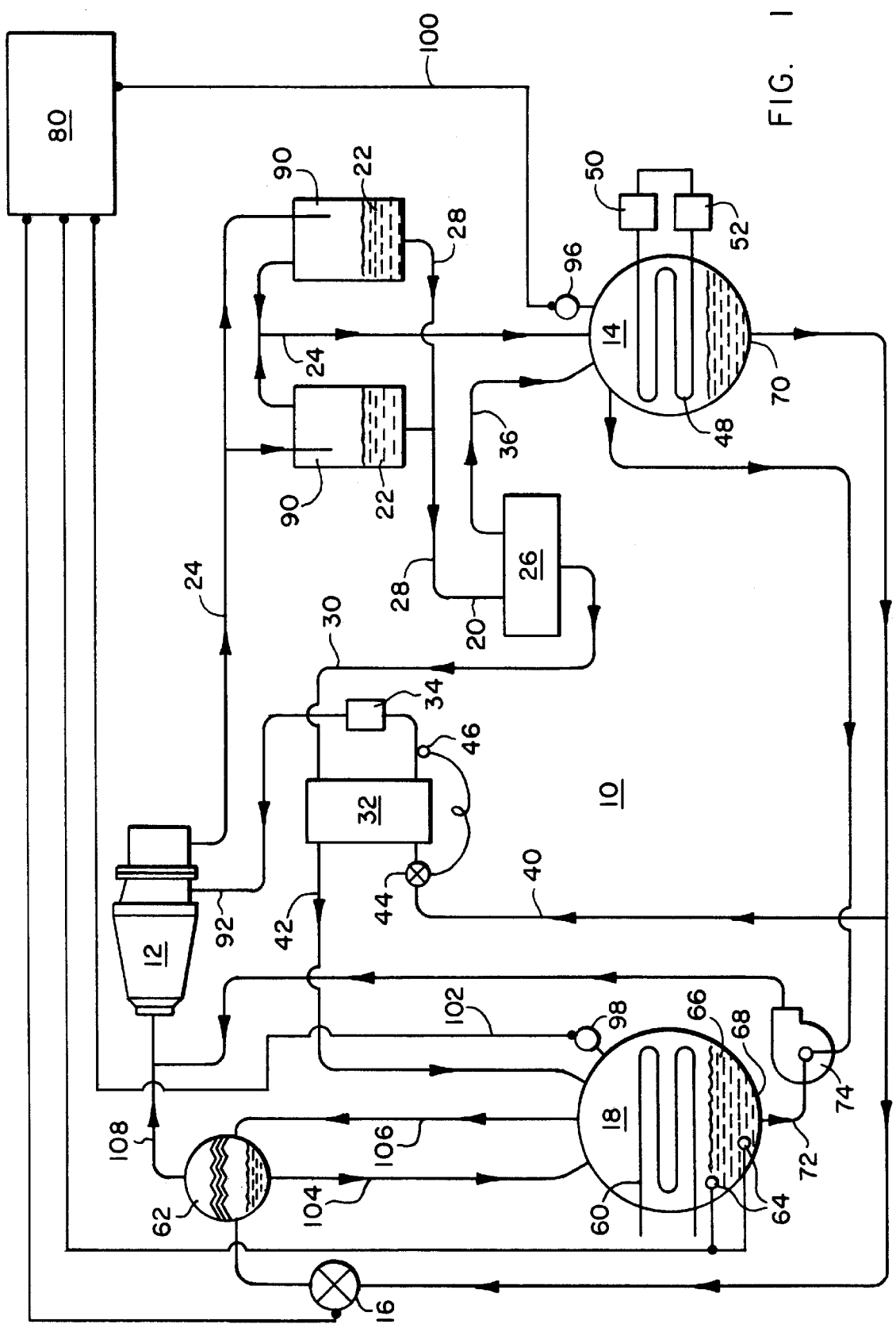
FIG. 1 is a schematic diagram of the chiller system according to the present invention.

Referring to FIG. 1, a chiller system 10 is comprised of a compressor 12, a condenser 14, an electronic expansion valve 16, and an evaporator 18, all of which are serially connected to form a hermetic closed loop system. Such a system is presently sold by The Trane Company, a Division of American Standard Inc., under the trademark Series R, Model RTHC as implemented as a water chiller system using a screw compressor. The present invention is contemplated to encompass other HVAC systems, other refrigeration systems, and other chiller systems, whether those systems employ screw compressors, centrifugal compressors, scroll compressors or reciprocating compressors. The defining element of the present invention is the use of system differential pressure across the compressor to return lubricant to the compressor, and the use of the expansion valve to maintain that differential pressure.

The system 10 includes a lubrication subsystem 20 including one or more oil separators 22 located in the compressor discharge line(s) 24 between the compressor 12 and the condenser 14. The oil separators 22 separate lubricant from refrigerant, directing the refrigerant to the condenser 14 and directing the lubricant to an oil sump 26 by means of lubricant lines 28. From the oil sump 26 the lubricant follows another lubricant line 30 through an optional oil cooler 32 and a filter 34 and then to the compressor 12. The lubrication subsystem 20 also includes a line 36 from the oil sump 26 to the condenser 14 and providing a refrigerant vapor return path from the oil sump 26 to the condenser 14. As empirically determined, the lubrication subsystem 20 typically experiences a pressure drop of about 22 PSID. Further details of the lubrication subsystem and the compressor are described in applicant's commonly assigned U.S. Pat. No. 5,341,658 to Roach et al. which is hereby incorporated by reference. Additional details are provided in applicant's commonly assigned U.S. Pat. Nos. 5,431,025 and 5,347,821 to Oltman et al., both of which are hereby incorporated by reference.

The optional oil cooler 32 is supplied with refrigerant from the condenser 14 by a refrigerant line 40 and returns the refrigerant to the evaporator 18 by a further refrigerant line 42. The operation of the oil cooler 32 is controlled by a thermal expansion valve 44 in the refrigerant line 40 and having a sensor 46 operably connected to the lubricant line 30 at a convenient location.

Refrigerant is condensed in the condenser 14 typically using an inexpensive heat transfer medium such as water in a cooling coil 48 as provided from a source 50 such as a cooling tower or a city main. Although not typical, a variable speed pump 52 can be provided to control the flow rate of the heat transfer medium through the coil 48. Further details of the relationship between the condenser 14 and the source 50 are provided in applicant's commonly assigned U.S. Pat. No. 5,600,960 to Schwedler et al. which is hereby incorporated by reference.

The evaporator 18 is providing chilled heat transfer fluid such as water by cooling the heat transfer fluid in a heat transfer coil 60 within the evaporator 18. The evaporator 18 itself is preferably of the falling film evaporator type described in applicant's commonly assigned U.S. Pat. Nos. 5,645,124 and 5,588,596 to Hartfield et al., both of which are hereby incorporated by reference, with the exception that the present invention includes an external liquid vapor separator 62 as opposed to an internal liquid vapor separator. Evaporator water temperature control and the related control of the expansion valve 16 are described in applicant's commonly assigned U.S. Pat. Nos. 5,419,146 and 5,632,154, both to Sibik et al., and both hereby incorporated by reference.

In either case, the expansion valve 16 is modulated to control the level of a liquid as measured by a sensor 64. A typical expansion valve 16 is described in applicant's U.S. Pat. No. 5,011,112 to Glamm and is controlled in accordance with the method described in applicant's U.S. Pat. No. 5,000,009 to Clanin. Each of these patents is commonly assigned with the present invention and is hereby incorporated by reference. While this sensor 64 is preferably measuring the liquid level of a pool 66 in the bottom 68 of the evaporator 18, the liquid level sensor 64 could also measure the liquid level of liquid in the liquid vapor separator 62 or the level of liquid in the bottom 70 of the condenser 14. Further details in this regard can be found in U.S. Pat. No. 5,632,154 to Sibik et al. In the case of measuring liquid level in a condenser, the speed of a variable speed pump 52 could be varied to assist in maintaining the system pressure differential.

Since the pool 66 at the bottom 68 of the evaporator 18 is comprised of a refrigerant/lubricant mixture which is lubricant rich, a drain line 72 is provided to return that lubricant rich mixture to the compressor 12. A gas pump 74 is provided to periodically pump an amount of the refrigerant/lubricant mixture to the compressor 12.

The present invention includes a controller 80 or group of controllers 80 effective to control the operation of the system 10. Exemplary controllers are sold by The Trane Company under the trademarks Tracer, UCP, Summit, SCP and PCM. For purposes of the present invention, the controller 80 controls the operation of the expansion valve 16 to maintain a desired liquid level in the bottom 68 of the evaporator 18 as measured by the liquid level sensor 64. This has the effect of maintaining a desired chilled water temperature at the exit of the heat transfer coil 60.

The system 10 uses system differential pressure, i.e. the condenser to evaporator pressure difference, to pump lubricant through the lubrication subsystem 20 to the compressor 12. This is described in further detail in the previously incorporated by reference Roach et al. patent, but can be seen in FIG. 1 where the upper portion 90 of the oil separator 22 is exposed to compressor discharge pressure while the oil return connection 92 of the lubricant subsystem is exposed to compressor suction pressure. This differential pressure forces lubricant through the lubrication subsystem 20 and to the compressor 12. Compressors of this type depend on this oil flow to seal the compressor screw or scroll elements for compression and bearing lubrication. Loss of this lubricant can lead to a compressor failure.

If the system differential pressure falls below a system dependent level, the compressor 12 may become oil starved leading to a failure. The problem of moving oil is difficult anytime the system differential pressure falls below the system dependent level. For example, 25 PSID from the condenser 14 to the evaporator 18 as measured by sensors 96 and 98 respectively and provided to the controller 80 by lines 100 and 102 respectively is a minimum requirement for the system differential pressure in the Series R® chillers.

During equalized starts where the condenser and evaporator pressures are roughly equal, the compressor 12 pumps the pressure down enough at the start-up to establish the lubricant flow through the lubrication subsystem 20. However, during inverted starts where the condenser pressure is less than the evaporator pressure and during low differential starts where the evaporator pressure is within 25 PSI of the condenser pressure, the pumping action of the compressor 12 may be insufficient to establish the requisite lubricant flow through the lubrication subsystem 20.

In the liquid level control system of the present invention, the differential pressure across the compressor 12 is effectively a function of the difference between the cooling water temperature in the coil 48 and the chilled water temperature in the coil 60. If the difference between the cooling water temperature and the chilled water temperature is small or inverted, the system differential pressure will be too small to pump lubricant back to the compressor 12 through the lubrication subsystem 20. The chiller system 10 will shutdown on a low oil flow diagnostic or a loss of oil diagnostic as determined by the controllers 80. The conditions needed to cause these diagnostics are typical of starts with low cooling tower temperatures and warm chilled water temperatures. Although this is typically a transient problem, the controller 80 may be unable to establish normal operating conditions.

More specifically, during normal running operational conditions, the liquid level sensor 64 measures the depth of the pool 66 and provides that sensed level to the controller 80. A proportional+integral+derivative (PID) algorithm in the controller 80 maintains a desired liquid level in the evaporator 18 by modulating the electronic expansion valve 16's position to effect the rate of refrigerant flow into the evaporator 18 from the liquid vapor separator 16 via line 104. The liquid level controlled by the controller 80 maintains a mass balance between the flow of refrigerant vapor removed from the evaporator 18 by the compressor 12 via the lines 106 and 108, and between the flow of liquid refrigerant returned from the condenser 14 through the expansion valve 16 to the evaporator 18 by the line 104. If the expansion valve 16 is open such that refrigerant flow into the evaporator 18 in line 104 exceeds the flow out of the evaporator 18 through line 106, the condenser 18 eventually drains to the point that vaporous refrigerant is flowing from the condenser 14 to the evaporator 18. Mass balance will eventually be re-established because of the refrigerant vapors lower density. However, the flow of refrigerant vapor from the condenser 14 reduces the chiller systems efficiency because the refrigerant vapor is eventually pumped back to the condenser 14 without providing effective cooling.

On the other hand, if the expansion valve 16 is closed too far, the pool 66 falls and eventually dries out. The compressor 12 is removing more refrigerant from the evaporator 18 by lines 106 and 108 than the expansion valve is replacing from the condenser 14, and the evaporator pressure will fall as measured by the sensor 98. As the evaporator pressure falls, the differential pressure across the compressor 12 increases. The higher differential pressure reduces the compressor efficiency, and flow through the compressor 12 falls such that the mass flow balance is re-established but the chiller systems efficiency is again reduced.

The present invention counteracts this by giving the expansion valve 16 a secondary control objective. This secondary control objective for the expansion valve 16 is maintaining a minimum compressor pressure differential.

FIG. 2 is an expansion valve control diagram in accordance with the present invention. Conventionally, the liquid level sensor 64 provides a liquid level measurement to the controller 80 which uses the conventional PID algorithm to command an expansion valve movement through the expansion valve 16. Referring to FIG. 3, the liquid level sensor 64 has a range 130 over which the sensor 64 senses a liquid level 132. In the preferred embodiment, this range 130 is approximately 2 inches so that the sensor 64 reads from a lower end 134 at 0 inches to an upper end 136 at 2 inches.

Due to the wide variety of applications of the liquid level sensor 64 and the varying equipment which the sensor can be used in, the sensor 64 does not have a conventional setpoint. Instead of a programmed setpoint residing in a RAM memory location or a setpoint entered by a device such as a sensor or a DIP switch, the liquid level sensor 64 of the present invention is installed and located so that the sensors midpoint 138 is centered at the desired liquid level 140 of the device being controlled. In the preferred embodiment, the midpoint 138 is in the center of the range 130, located 1 inch from each of the upper and lower ends 136, 134.

Referring now to both FIGS. 3 and 4, the flow chart 148 discloses how the use of a conventional setpoint is avoided. After starting the routine in any conventional way at step 150, an offset 142 between the desired liquid level 140 and the lower end 134 of the range 130 is calculated at step 152. In the preferred embodiment, this offset 142 is approximately 1 inch. The actual liquid level 132 is measured and forwarded from the sensor 64 to the controller 80 as indicated by step 154. In FIG. 3, the actual error 144 between the desired liquid level 140 and the measured liquid level 132 is shown.

At step 156, the offset 142 is subtracted from the measured liquid level 132 as shown by reference numeral 158. This effectively re-centers the error 144 about the lower end 134 of the range 130. The re-centered error 146 is now centered at the 0 inch measurement of the range 130. By comparing, at step 160, the re-centered error 146 to 0, an easy determination of whether to open or close the expansion valve can be made based upon the positive or negative qualities of the re-centered error 146. Additionally, the magnitude of the re-centered error 146 determines the magnitude of the expansion valve change. Step 162 indicates that the error is conventionally controlled in response to the error as so determined. Line 164 indicates that the cycle is repeated in accordance with the controller 80's normal operating scheme.

Basically, the liquid level sensor 64 is physically calibrated to the desired liquid level and the use of a conventional setpoint is avoided by selecting any point in the sensor's range and using that selected point as a setpoint. This is advantageous where the sensor 64 is used in a wide variety of equipment and avoids the determination of what the setpoint should be. Instead, in one approach, the sensor 64 can be externally marked with an indicator showing the location of the selected point, and that indicator aligned with the desired liquid level in the device to be controlled.

Referring again to FIG. 2, the expansion valve 16 is given the secondary control objective to maintain the minimum compressor pressure differential. A second error is formed at summator 120 by comparing the condenser pressure as determined by the sensor 96 minus the evaporator pressure as determined by the sensor 98 and minus the minimum required system pressure differential as empirically determined and provided from a memory location 122. In the present invention, the minimum required system differential pressure 25 PSID was determined to be slightly greater than the 22 PSID pressure drop across the lubrication subsystem 20. The pressure differential error determined by the summator 120 is scaled at scaler 124 to a similar scale as the liquid level error and provided to an error arbitrator 126.

The error arbitrator 126 compares the liquid level error provided by the summator 118 with the pressure differential error provided by the summator 120, and passes the smaller of the two errors to the PID algorithm 119.

With this arrangement, the expansion valve 16 will maintain at least 25 PSID across the compressor 12. Since the system pressures naturally build when the chilled water in the coil 60 cools down and when the cooling water in the coil 48 heat up, the expansion valve 16 will open and cause the pool 66 in the evaporator 18 to rise. As the pool 66 rises, the control objective for the expansion valve 16 will transition from controlling the pressure differential to controlling the liquid level in the pool 66. Because the chiller system 10 can run in differential pressure control indefinitely, the chiller system 10 will always establish normal operating conditions. If at any time the system pressures fall, the control objective for the expansion valve 16 will transition back to the differential pressure control.

The present invention provides a controller which has the primary objective of maintaining a system condition such as chilled water temperature, evaporator liquid level, or superheat but also has secondary objective of maintaining a secondary system condition such as compressor pressure differential. It will be apparent to a person of ordinary skill in the art that many modifications and alterations of this arrangement are possible including substituting various compressors requiring lubricant pumping based on system pressure differential and using various primary conditions as the primary expansion valve control objective. All such modifications are contemplated to fall within the spirit and scope of the claims.

What is desired to be claimed for Letters Patent of the United States is as follows:

1. A method of controlling liquid level in an HVAC system comprising the steps of:

physically calibrating a liquid level sensor to a desired level;

calculating an offset from a selected point of the liquid level sensor to a lower end;

measuring a liquid level;

subtracting the calculated offset from the measured liquid level;

comparing the subtracted result to zero to determine an error; and controlling the liquid level to minimize the error.

2. The method of claim 1 wherein the calibrating step includes the further step of aligning a selected point on the sensor to the desired level.

3. The method of claim 2 wherein the sensor has a range and the selected point is located substantially at the center point of the range.

4. The method of claim 3 wherein the controlling step includes the use of an expansion valve.

5. The method of claim 1 including the further step of recentering the error about the lower end.

6. The method of claim 5 including the further step of using the magnitude of the error to determine a change in an expansion valve position.

7. A method of controlling the liquid level in an HVAC system comprising the steps of:

physically calibrating a liquid level sensor to a desired level;

selecting any point in the sensor's range;

using that selected point as a setpoint; and controlling the liquid level in the HVAC system to the setpoint.

8. The method of claim 7 externally marking the sensor with an indicator showing the location of the selected point.

9. The method of claim 8 including aligning the indicator with a desired liquid level in the device to be controlled.

10. Apparatus controlling the liquid level in an HVAC system comprising:

a liquid level sensor for measuring a liquid level;

a liquid level modulator for modulating the liquid level;

a device physically calibrating the liquid level sensor to a desired level; and a controller calculating an offset from a selected point of the liquid level sensor to a lower end, subtracting the calculated offset from the measured liquid level, comparing the subtracted result to zero to determine an error, and controlling the liquid level modulator to minimize the error.

11. The apparatus of claim 10 wherein a selected point on the sensor is aligned to the desired level.

12. The apparatus of claim 11 wherein the sensor has a range and a selected point is located substantially at the center of the range.

13. The apparatus of claim 12 wherein the liquid level modulator includes an expansion valve.

* * * * *